United States Patent
Lien

(10) Patent No.: US 7,446,480 B2
(45) Date of Patent: Nov. 4, 2008

(54) APPARATUS AND METHOD FOR SWITCHING A LIGHT SOURCE

(75) Inventor: Te-Li Lien, Taipei (TW)

(73) Assignee: Mitac International Corp., Taoyuan (TW)

( * ) Notice: Subject to any disclaimer, the term of this patent is extended or adjusted under 35 U.S.C. 154(b) by 348 days.

(21) Appl. No.: 11/162,040

(22) Filed: Aug. 26, 2005

(65) Prior Publication Data

US 2006/0170369 A1    Aug. 3, 2006

(30) Foreign Application Priority Data

Feb. 1, 2005    (TW) .............................. 94103013 A

(51) Int. Cl.
*H05B 37/02* (2006.01)

(52) U.S. Cl. ................... 315/158; 315/159; 315/153; 315/154

(58) Field of Classification Search ............ 315/308, 315/153, 154, 158, 159

See application file for complete search history.

(56) References Cited

U.S. PATENT DOCUMENTS

| 4,520,681 | A | * | 6/1985 | Moore et al. ............ 73/862.28 |
| 5,708,455 | A | * | 1/1998 | Maekawa ................. 345/100 |
| 6,089,721 | A | * | 7/2000 | Schierbeek ............... 359/603 |
| 7,236,154 | B1 | * | 6/2007 | Kerr et al. ................ 345/102 |
| 2003/0198048 | A1 | * | 10/2003 | Frederick ................. 362/249 |
| 2006/0133099 | A1 | * | 6/2006 | Thannikary et al. ....... 362/459 |

* cited by examiner

*Primary Examiner*—Tuyet Vo
*Assistant Examiner*—Jae K Kim
(74) *Attorney, Agent, or Firm*—Jianq Chyun IP Office

(57) ABSTRACT

An apparatus and its corresponding method for switching a light source are provided. The apparatus includes a light sensor, a decision device and a light source. The light sensor senses the ambient luminance and outputs a sensing signal to indicate whether the luminance is greater than a predetermined quantity. The decision device is connected to the light sensor. It receives a switching signal and outputs a lighting signal according to the sensing signal and the switching signal. The light source is coupled to the decision device and is activated whenever the lighting signal demands light.

8 Claims, 2 Drawing Sheets

APPARATUS AND METHOD FOR SWITCHING A LIGHT SOURCE

CROSS-REFERENCE TO RELATED APPLICATION

This application claims the priority benefit of Taiwan application serial no. 941 03013, filed on Feb. 1, 2005. All disclosure of the Taiwan application is incorporated herein by reference.

BACKGROUND OF THE INVENTION

1. Field of the Invention

This invention generally relates to an apparatus and method for switching a light source by using a light sensor. And especially to an apparatus and method for switching a light source by using a light sensor to judge whether or not a light source should be activated.

2. Description of Related Art

In the conventional keyboard of a mobile telephone, light emitting diode (i.e. LED) is generally utilized for the background light design. In addition, the lighting time and occasion are fixed regardless under sun light or in a dark room. However, when a user is in a sufficient light environment, it is not necessary to have the background light LED of the keyboard activated. Since the LED is not switched off at the time, the mobile telephone consumes a great amount of power. The communication time and standby period of the mobile telephone are therefore affected. Nowadays, due to the design trend of a mobile phone being light, thin and small, the volume and capacity of the battery can not be unlimitedly increased. The prior art fixed light emitting method is disadvantageous in the aspect of power consumption.

Accordingly, we need a better method to solve the above-mentioned problem so as to avoid power waste under the sufficient light environment.

SUMMARY OF THE INVENTION

An object of the present invention is to provide an apparatus and method for switching a light source. The present invention aims to disable the light source from emitting light under a sufficient light environment so to avoid power waste. When the present invention is utilized to the mobile telephone and other handy electrical devices, the power of the battery will be used with utmost efficiency without unnecessary waste. Further, the communication hours and the standby period can be extended so that to accord with the recent principle of light, thin, small and long standby period. Hence, the design flexibility and production practicability can be improved. When the present invention is applied to general light source, it also can achieve the advantages of saving electric power and lengthen the lifetime of light sources.

In order to achieve the above mentioned objects and other objects, the present invention provides an apparatus for switching a light source. The apparatus comprises a light sensor, a decision device and a light source. The light sensor senses the ambient luminance and outputs a sensing signal to indicate whether the luminance is greater than a predetermined value. The decision device is coupled to the light sensor, receives a switching signal and outputs a lighting signal according to the switching signal and the sensing signal. The light source is coupled to the decision device and decides whether or not to emit light according to the lighting signal.

In accordance with the above mentioned apparatus for switching a light source in a preferred embodiment of the present invention, when the sensing signal is at a logic high voltage, it means that the luminance is greater than the predetermined value.

In accordance with the above mentioned apparatus for switching a light source in the preferred embodiment of the present invention, the above mentioned light sensor further comprises a direct current voltage source, a ground and an ambient light sensor. Wherein, the voltage of the direct current voltage source is at a logic high voltage, the voltage of the ground is at a logic low voltage. The light sensor is coupled among the direct current voltage source, the ground and an output end of the light sensor; connects the direct current voltage source and the output end when the luminance is greater than the predetermined value so that the light sensor outputs the logic high voltage. Contrarily, the light sensor disconnects the direct current voltage source and the output end when the luminance is less than or equal to the predetermined value so that the light sensor outputs the logic low voltage.

In accordance with the above mentioned apparatus for switching a light source in a preferred embodiment of the present invention, when the luminance is greater than the predetermined value, the decision device outputs a lighting signal which indicates that the light source should not emit light. When the luminance is less than or equal to the predetermined value, the decision device directly outputs the switching signal as the lighting signal.

In accordance with the above mentioned apparatus for switching a light source in the preferred embodiment of the present invention, when the lighting signal is at the logic high voltage, it indicates that the light source should not emit light.

In accordance with the above mentioned apparatus for switching a light source in the preferred embodiment of the present invention, the above mentioned decision device further comprises a direct current voltage source and an analog switch. Wherein, the voltage of the direct current voltage source is at the logic high voltage. The analog switch is coupled between the direct current voltage source and the output end of the decision device; receives the lighting signal and the switching signal; connects the direct current voltage source and the output end when the luminance is greater than the predetermined value so that the decision device outputs the lighting signal with the logic high voltage; and connects the switching signal and the output end when the luminance is less than or equal to the predetermined value so that the decision device directly outputs the switching signal as the lighting signal.

In accordance with the above mentioned apparatus for switching a light source in the preferred embodiment of the present invention, the light source emits light when the lighting signal is at logic low voltage.

In accordance with the above mentioned apparatus for switching a light source in the preferred embodiment of the present invention, the above mentioned decision device further comprises a direct current voltage source, a switching device and a light emitting diode (i.e. LED). Wherein, voltage of the direct current voltage source is at the logic high voltage. The switching device is coupled to the direct current voltage source; receives the lighting signal; turned on when the lighting signal is at the logic low voltage; outputs the voltage of the direct current voltage source. The LED is coupled to the switching device and emits light when the output of the switching device is at logic high voltage.

In accordance with the above mentioned apparatus for switching a light source in the preferred embodiment of the present invention, the above mentioned switching device is a PMOS transistor.

In another view, the present invention provides a method for switching a light source. The method comprises the following steps: first, sense an ambient luminance; further, disable the light source from emitting light when the luminance is greater than a predetermined value; and decide whether or not the light source should emit light according to a switching signal when the luminance is less than or equal to the predetermined value.

In accordance with the description of the preferred embodiments in the present invention, the present invention utilizes the light sensor to sense ambient luminance. When there is sufficient ambient light, the light source will be switched off so to disable it from emitting light. Therefore, the present invention can eliminate unnecessary waste of energy and achieve the advantages of saving electric power and lengthen the lifetime of light sources.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENTS

The following is a preferred embodiment for describing an apparatus for switching a light source according to the present invention.

Figure 1:
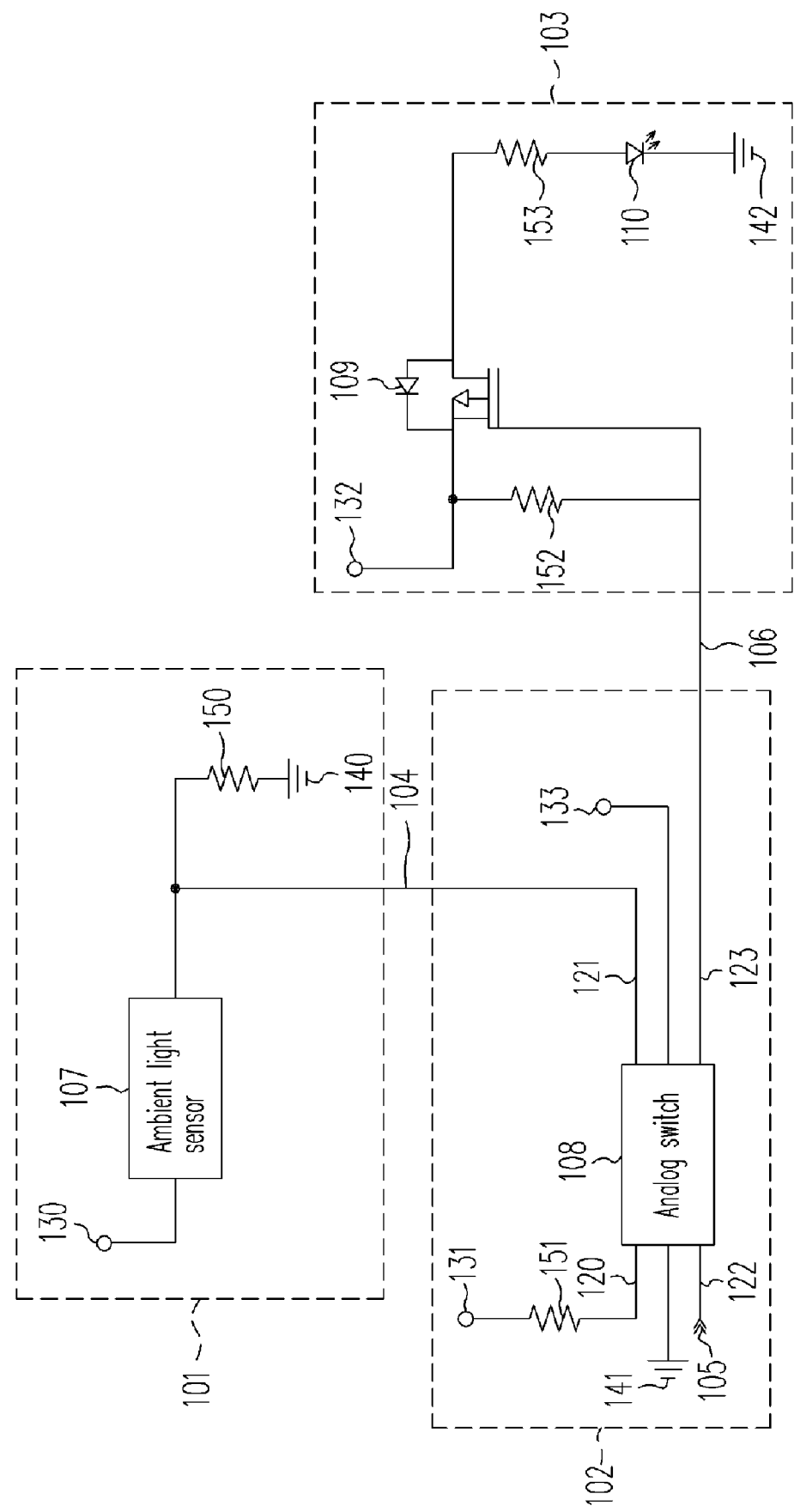
FIG. 1 is a drawing schematically showing a view of a circuit of an apparatus for switching a light source according to an embodiment of the present invention.

FIG. 1 is a drawing schematically showing a circuit diagram of an apparatus for switching a light source according to an embodiment of the present invention. Wherein, the circuit comprises a light sensor 101, a decision device 102 and a light source 103. In brief, the light sensor 101 senses the ambient luminance and outputs a sensing signal 104 to indicate whether the luminance is greater than a predetermined value. In the embodiment, the predetermined value is about 51 lux. The decision device 102 is coupled between the light sensor 101 and the light source 103, receives a switching signal 105 and the sensing signal 104 and outputs a lighting signal 106 according to these two signals. The light source 103 is coupled to the decision device 102 to receive the lighting signal 106 and decides whether or not it emits light according to the lighting signal 106.

The light sensor 101 comprises a direct current voltage source 130, a ground 140, an ambient light sensor 107 and a resistor 150. The direct current voltage source 130 provides a voltage with a logic high voltage. The ground 140 provides a voltage with a logic low voltage. The ambient light sensor 107 is coupled among the direct current voltage source 130, the ground 140 and the output end of the light sensor 101. The ambient light sensor 107 senses the ambient luminance, connects the direct current voltage source 130 and the above mentioned output end when the luminance is greater than the predetermined value so that the light sensor 101 outputs the sensing signal 104 with the logic high voltage. When the sensed luminance is less than or equal to the predetermined value, the ambient light sensor 107 disconnects the direct current voltage source 130 and the output end so that the light sensor 101 outputs the sensing signal 104 with the logic low voltage.

The decision device 102 comprises direct current voltage sources 131 and 133, an analog switch 108, a ground 141 and a resistor 151. The direct current voltage source 131 provides a voltage with a logic high voltage. The analog switch 108 is coupled between the direct current voltage source 131 and the output end of the decision device 102; receives the sensing signal 104 via the line 121; receives the switching signal 105 via the line 122; and decides the output voltage of the lighting signal 106. Wherein, the switching signal 105 is from the user's interface, for example, a key of the keyboard of the mobile telephone, which the key is used to switch on the light source of the background light. When the luminance is greater than the above mentioned predetermined value, it means that the sensing signal 104 is at the logic high voltage. The analog switching 108 will connect the lines 120 and 123 so that the decision device 102 outputs the lighting signal 106 with logic high voltage. When the luminance is less than or equal to the predetermined value, it means that the sensing signal 104 is at the logic low voltage. The analog switching 108 will connect the lines 122 and 123 so that the decision device 102 directly outputs the switching signal 105 as the lighting signal 106.

The light source 103 comprises a direct current voltage source 132, a switching device 109, an LED 110, a ground 142 and resistors 152 and 153. The direct current voltage source 132 provides a voltage with a logic high voltage. The switching device 109 is coupled between the direct current voltage source 132 and the LED 110 to receive the lighting signal 106. When the lighting signal 106 is at the logic low voltage, the switching device 109 is turned on and outputs the logic high voltage from the direct current voltage source 132 so that the LED emits light. In the embodiment, the switching device 109 is a PMOS (p-channel metal oxide semiconductor) transistor which receives the lighting signal 106 with the gate.

Generally speaking, in a sufficient light environment, the ambient luminance is greater than the predetermined value. The sensing signal 104 will be at logic high voltage so that the light signal 106 of the output of the decision device 102 is also at logic high voltage. At this point, the PMOS transistor 109 will disable the direct current voltage source 132 and the LED 110. No matter what voltage the switching signal 105 is at, the LED 110 will not emit light so power waste can be avoided. Whereas, when the light is insufficient, the ambient luminance will be less than or equal to the above mentioned predetermined value, the sensing signal 104 will be at logic low voltage. Accordingly, the decision device 102 directly outputs the switching signal 105 to the gate of the PMOS transistor 109. Whether or not the LED emits light depends on the voltage of the switching signal 105, which depends on the user's action.

In addition to the above mentioned apparatus for switching a light source, the present invention also provides a corresponding method for switching a light source which is described with an embodiment as follows.

Figure 2:
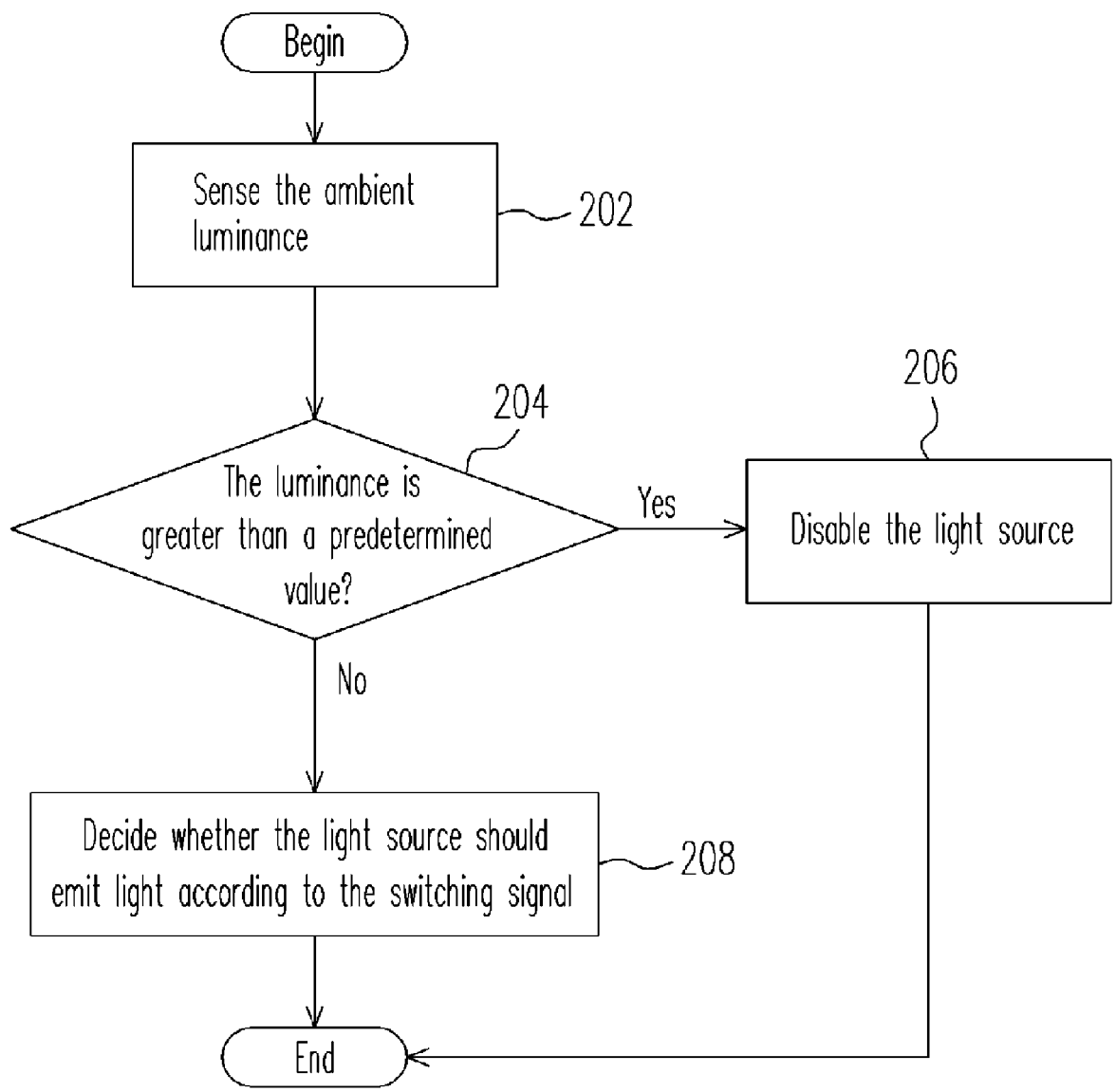
FIG. 2 is a drawing schematically showing a view of a flow chart of a method for switching a light source according to an embodiment of the present invention.

FIG. 2 is a drawing schematically showing a flow chart of a method for switching a light source according to an embodiment of the present invention. First, step 202 senses the ambient luminance. Further, step 204 judges whether or not the luminance is greater than a predetermined value. In the embodiment, the predetermined value is about 51 lux. If the luminance is greater than the predetermined value, step 206 will be carried out to disable the light source from emitting light. Otherwise, step 208 is performed to decide whether or not the light source should emit light according to the switching signal from the user.

In summary, under a sufficient light environment, the apparatus and its corresponding method for switching a light source in the present invention disable the light source from emitting light so as to avoid power waste. When the present invention is utilized to a mobile telephone and other handy electrical devices, the power of the battery will be used with utmost efficiency without unnecessary waste. Further, the communication and standby period can be extended. The present invention accords with the recent principle of light, thin, small and long standby period. Therefore, the design flexibility and production practicability can be increased. When the present invention is utilized to general light source, it also can achieve the advantages of saving electric power and lengthen the lifetime of light sources.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. An apparatus for switching a light source, comprising:
   a light sensor for sensing an ambient luminance and outputting a sensing signal to indicate whether the luminance is greater than a predetermined value;
   a decision device, comprising:
      a first direct current voltage source providing a first logic high voltage;
      an analog switch, coupled between the first direct current voltage source and an output end of the decision device for receiving the sensing signal and a switching signal, wherein the analog switch connects the first direct current voltage source and the output end when the luminance is greater than the predetermined value so that the decision device outputs the first logic high voltage as a lighting signal, and the analog switch connects the switching signal and the output end when the luminance is less than or equal to the predetermined value so that the decision device directly outputs the switching signal as the lighting signal; and
   a light source, coupled to the output end of the decision device, deciding whether or not to emit light according to the lighting signal.

2. The apparatus for switching a light source of claim 1, wherein the predetermined value is about 51 lux.

3. The apparatus for switching a light source of claim 1, wherein when the sensing signal is at a second logic high voltage, the sensing signal indicates that the luminance is greater than the predetermined value.

4. The apparatus for switching a light source of claim 3, wherein the light sensor further comprises:
   a second direct current voltage source providing the second logic high voltage;
   a ground providing a logic low voltage; and
   an ambient light sensor, coupled among the second direct current voltage source, the ground and an output end of the light sensor, sensing the luminance, connecting the second direct current voltage source and the output end when the luminance is greater than the predetermined value so that the light sensor outputs the second logic high voltage; and disconnecting the second direct current voltage source and the output end when the luminance is less than or equal to the predetermined value so that the light sensor outputs the logic low voltage.

5. The apparatus for switching a light source of claim 1, wherein when the lighting signal is at the first logic high voltage, the lighting signal indicates that the light source should not emit light.

6. The apparatus for switching a light source of claim 1, wherein the light source emits light when the lighting signal is at a logic low voltage.

7. The apparatus for switching a light source of claim 6, wherein the light source further comprises:
   a second direct current voltage source providing a second logic high voltage;
   a switching device, coupled to the second direct current voltage source, receiving the lighting signal, turned on when the lighting signal is at the logic low voltage and outputs the second logic high voltage; and
   a light emitting diode (LED), coupled to the switching device, emitting light when the output of the switching device is at the second logic high voltage.

8. The apparatus for switching a light source of claim 7, wherein the switching device is a PMOS transistor.

* * * * *